INVENTORS:
Takeo Miura and Junzo Iwata,
BY
Marmorek & Bierman,
Their Attorneys.

3,522,419

ELECTRICAL DEVICE FOR COMPENSATING A DIGITAL EXECUTION TIME IN HYBRID COMPUTER SYSTEMS AND THE LIKE

Takeo Miura, Tokyo-to, and Junzo Iwata, Hanamaki-shi, Japan, assignors to Kabushiki Kaisha Hitachi Seisakusho, Marunouchi, and Hitachi Denshi Kabushiki Kaisha, both of Tokyo-to, Japan, both joint-stock companies of Japan Continuation-in-part of application Ser. No. 365,336, May 6, 1964. This application May 1, 1968, Ser. No. 725,717
Claims priority, application Japan, May 15, 1963, 38/24,165
Int. Cl. G06g *7/18;* G06j *3/00*
U.S. Cl. 235—150.51 4 Claims

ABSTRACT OF THE DISCLOSURE

An electrical device for compensating a digital execution time in hybrid computer systems and the like, wherein the input signal of an analog integrator is applied to a potentiometer whose multiplication factor is set to be equal to the product of the digital execution time and the multiplication factor of said integrator and the output signal of the potentiometer is inverted by an inverter whose inverted output signal is added to the output signal of said integrator so as to compensate the digital execution time.

This is a continuation-in-part, application of our copending application Ser. No. 365,336, filed May 6, 1964, entitled "Hybrid Computer and Simulator and now abandoned.

This invention relates to an electrical device for compensating a digital execution time in hybrid computer systems and the like.

As is well known, the so-called hybrid computer system is provided with an analog computer and a digital computer, which are functionally combined with each other so as to carry out required computation while exchanging their informations from one to another. According to this system, analog quantities in the analog computer which vary continuously with respect to time are sampled at a certain time interval and thereafter converted into digital quantity to supply them to the digital computer. The digital computer serves to carry out required digital computation in accordance with the information from the analog computer. The result of computation is usually introduced into the analog computer after the digital-to-analog conversion, whereby subsequent analog computation is carried out by the analog computer.

In this system, since it is impossible to infinitely shorten or reduce the sampling period for the analog quantities and the time required for the digital computation, analog to digital conversion and digital to analog conversion, some objectionable error tends to arise originating from such period and time.

Accordingly, it is a general object of the present invention to provide an electrical device, according to which any error originating from the abovementioned digital execution time can be effectively compensated.

A more specific object of the present invention is to provide an execution-time compensating device for hybrid computer systems which can be easily assembled with conventional components or parts.

Another object of the present invention is to provide an execution-time compensation device which is applicable to a wide range of uses, particularly to hybrid computers and to various types of simulators wherein hybrid computers are used.

These objects as well as additional objects and advantages of the present invention will become more apparent from the following description when taken in connection with the accompanying drawing, wherein.

Figure 1:
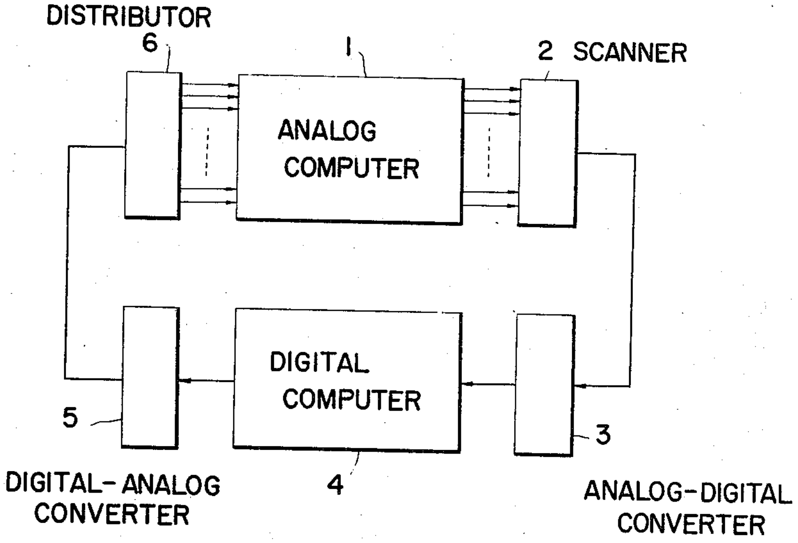
FIG. 1 is a block diagram showing the composition and arrangement of a conventional hybrid computer system.

Referring now to FIG. 1 which illustrates the conventional hybrid computer system, the system comprises an analog computer 1, a scanner 2, an analog-to-digital converter 3 (hereinfter referred to as an A–D converter), a digital computer 4, a digital-to-analog converter 5 (hereinafter referred to as a D–A converter) and a distributor 6. During progress of computation in the analog computer 1, the analog informations from various logical operation circuits (the interim results of the analog computation) are introduced into the scanner 2, in which they are sampled successively. The output of the scanner is converted into digital quantity by the A–D converter 3 and thereafter introduced into the digital computer 4, wherein the required digital computation is accomplished in accordance with the information from the analog computer 1. The result of digital computation is converted into analog quantity by the D–A converter 5 and thereafter distributed to the respective logical operation circuits of the analog computer 1 by the distributor 6. The detail of the above-mentioned operation has been disclosed in a publication titled "Analog/Digital Computer Linkage System Type 4,030" (Electronics Associates, Inc., Release No. PIR#901–1, received in U.S. Patent Office on Mar. 17, 1959).

Figure 2:
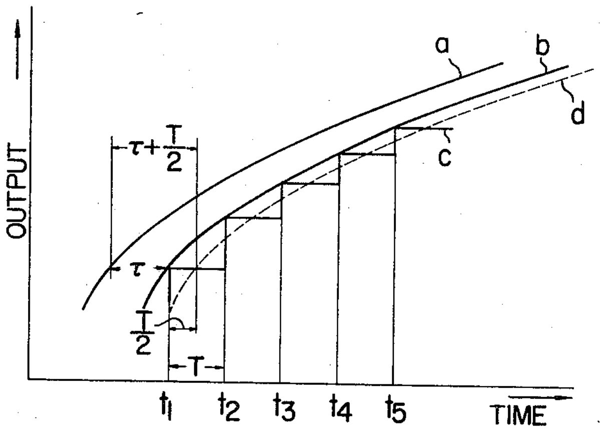
FIG. 2 is a graphical representation showing the relationship between the ideal output and the actual output of a digital computer used in the hybrid computer system of FIG. 1.

In the above mentioned hybrid computer system, a problem tends to arise originating from the digital execution time thereof. More explicitly, in this system, the analog quantities varying continuously with respect to time are sampled by the scanner 2 at a certain time interval (hereinafter denoted by T) as mentioned above. On the other hand, a relatively large time (hereinafter denoted by $\tau$) is required for the digital computation in the digital computer 4 and the A–D and D–A conversions in the converters 3 and 5. In FIG. 2, a curve indicated by a reference *a* shows an ideal output waveform of the D–A converter 5 in FIG. 1 in case the sampling period T in the scanner 2 is selected infinitely short, and the abovementioned time $\tau$ is approximately zero. A curve *b* in FIG. 2 shows an output waveform in case only the time $\tau$ is taken into consideration. As is apparent from the graphical representation, the curve *b* lags by the time $\tau$ behind the ideal output curve *a*.

In the conventional hybrid computer system, the digital information from the digital computer is introduced into the analog computer in the form of an analog signal wherein the analog value indicating any result of digital computation at a certain stage is held until such value is renewed by the result of digital computation at the next stage. Consequently, the input to the analog computer, i.e., the output signal of the D–A converter, exhibits such a staircase waveform that varies step by step for every sampling time as shown with a curve *c* in FIG. 2. In case the analog computer circuit is insensitive to rapid variation in the input thereof, the waveform of the result of analog computation obtained by such circuit becomes equivalent to a smooth curve *d* in FIG. 2. If the period of such variation is remarkably larger than the sampling period T, it is possible to consider that the curve *d* is delayed by a time $T/2$ behind the curve *b*. Accordingly, in the hybrid computer system, the result of analog computation obtained in accordance with the digital information from the digital computer is delayed by a time $$\tau+\frac{T}{2}$$

in comparison with the output of the analog computer which was used as the input information to the digital computer, the time $$\tau+\frac{T}{2}$$

being hereinafter called "the digital execution time." The present invention contemplates providing an electrical device for compensating the abovementioned digital execution time $$\tau+\frac{T}{2}$$

Figure 3:
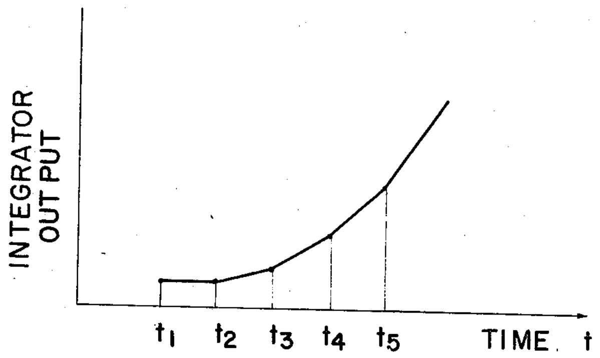
FIG. 3 is a graphical representation showing the output waveform of a conventional analog integrator in case wherein a digital output of the digital computer is caused to be the input thereof.
Figure 4:
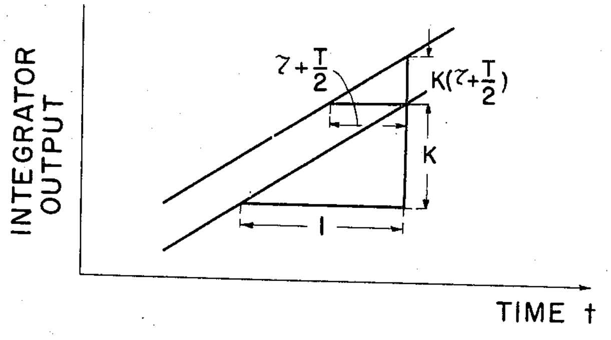
FIG. 4 is a graphical representation showing the principle of the present invention.

Generally speaking, when an input signal having such a staircase waveform as shown with the curve *c* in FIG. 2 is caused to enter into a conventional analog integrator, the output of the same assumes such a waveform that is represented by a series of consecutively connected straight lines, as shown in FIG. 3. The slope of each straight line is proportional to the value of the input signal at respective time instants $t_1$, $t_2$, . . . , at which the input signal is renewed at new values. If only one of the above straight lines is now taken into consideration for the sake of simplicity in explanation, it can be represented by a line *e*, as shown in FIG. 4, for example. In FIG. 4, a straight line *f* indicates a waveform which is caused to lead by the time $$\tau+\frac{T}{2}$$

before the line *e*, and a reference *k* indicates the slope or rate of variation with time of the line *e*. As is apparent from FIG. 4, in order to cause the line *e* to lead in time by $$\tau+\frac{T}{2}$$

a value $$k\left(\tau+\frac{T}{2}\right)$$

is required to add to the line *e*. This means that the digital execution time $$\tau+\frac{T}{2}$$

in question can be compensated by adding the above value to the output of the integrator. The slope or rate of variation *k* of the line *e* in FIG. 4 is equal to a value obtained by multiplying the input value of the integrator by the multiplication factor α thereof. Accordingly, the value $$k\left(\tau+\frac{T}{2}\right)$$

can be obtained by multiplying the input of the integrator by a product of the factor α and the execution time $$k\left(\tau+\frac{T}{2}\right)$$

The factor α is a constant value which is given by the structure of the integrator to be used, and the execution time $$\left(\tau+\frac{T}{2}\right)$$

is also a constant value inherent to the given hybrid computer system. Consequently, the above product $$\left( +\frac{T}{2}\right)$$

can be set on a suitable potentiometer as a constant factor thereof.

Figure 5A:
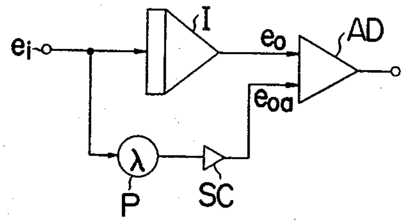
FIGS. 5(A), 5(B), 5(C) and 5(D) are circuit diagrams showing various embodiments of the present invention.

FIG. 5(A) illustrates one embodiment of the present invention, wherein a reference I indicates an analog integrator having a multiplication factor α; reference P, a potentiometer having a multiplication factor $$\lambda=\left(\tau+\frac{T}{2}\right)$$

reference SC, an inveter; and AD an adder, respectively. When an input signal $e_i$ of staircase waveform is introduced into an input terminal 51 of the analog integrator I, such an output signal $e_o$ as shown in FIG. 3 is obtained therefrom in the opposite polarity to the input signal. A part of the input signal $e_i$ is also introduced into the potentiometer P, and the output $e_{oa}$ thereof is further introduced into an inverter SC, wherein the polarity of the same is caused to invert. Both the outputs $e_o$ and $e_{oa}$ from the integrator I and inverter SC are introduced into the adder AD where they are added to each other. The output $e_o$ of the integrator I is given by $$e_o=-\alpha\int e_i dt$$

and the output $e_{oa}$ of the inverter is given by $$e_{oa}=-\alpha\left(\tau+\frac{T}{2}\right)$$

Accordingly, the output of the adder is given by $$e_o+e_{oa}=-\alpha\left\{\int e_i dt+\left(\tau+\frac{T}{2}\right)\right\}$$

This means that the output $e_o$ of the integrator I is caused to lead by the time $$\left(\tau+\frac{T}{2}\right)$$

which corresponds to the digital execution time.

In the conventional hybrid computer system, the result of the digital computation becomes, in many cases, the which corresponds to the digital execution time. input-to-analog integrators included in the analog computer. Accordingly, the integrator I in FIG. 5(A) can be substituted for one included in the analog computer.

Figure 5B:
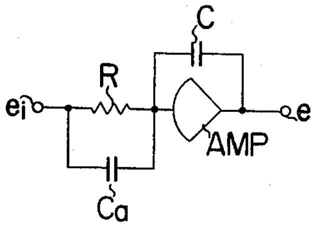
Figure 5C:
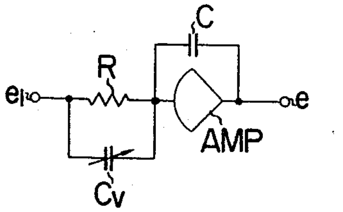

It has been known that an analog integrator having a capacitive reactance as an input impedance thereof serves as an inverter circuit. Accordingly, the inverter SC in FIG. 5(A) can be eliminated by using the circuit arrangement shown in FIG. 5(B)–5(D). In FIG. 5(B), a reference AMP indicates a high gain amplifier; reference C a capacitor for integration inserted into the feedback path of the amplifier; and reference R an input resistance for the amplifier, respectively. An analog integrator can be assembled with these elements AMP, C and R, as is well known. In this embodiment, an additional capacitor *Ca* is connected across the resistor R.

The capacitance of the capacitor *Ca* is selected to be equal to the product λC of said multiplication factor λ and the capacitance of the capacitor C. Therefore the output *e* of the amplifier AMP is given by $$\begin{aligned} e&=-\frac{1}{RC}\int e_i dt-\frac{Ca}{C}e_i \\ &=-\alpha\int e_i dt-\lambda e_i \\ &=-\alpha\left\{\int e_i dt+\left(\tau+\frac{T}{2}\right)e_i\right\} \end{aligned}$$

where $$\alpha=\frac{1}{RC},\ \lambda=\frac{Ca}{C}=\alpha\left(\tau+\frac{T}{2}\right)$$

In this case, if the value $$\alpha\left(\tau+\frac{T}{2}\right)$$

is unknown, an adjustable capacitor $Cv$ or a series circuit of a potentiometer P and additional capacitor $Cb$ must be substituted for said capacitor $Ca$ as shown in FIGS. E(C) and 5(D). Then, the capacitance of the adjustable capacitor $Cv$ is experimentally set to be equal to $$\alpha\left(\tau+\frac{T}{2}\right)C$$

The multiplication factor of the potentiometer P is experimentally set to be equal to $$\alpha\left(\tau+\frac{T}{2}\right)\frac{C}{Cb}$$

Figure 5D:
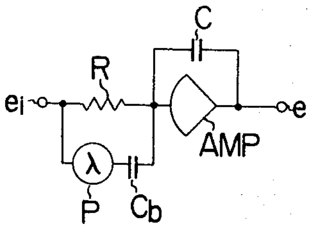

In FIG. 5(D), since the value $$\alpha\left(\tau+\frac{T}{2}\right)\frac{C}{Cb}$$

(the multiplication factor of the potentiometer P) is extremely small in usual, the potentiometer P operates simply as a voltage divider whose resistance value is negligible.

As is apparent from the above description, it is possible to compensate the digital execution time by using extremely simple means.

It should be understood, of course, that the above disclosure relates to preferred embodiments of the invention, and it is intended to cover all changes and modifications of said embodiments so far as they do not depart from the spirit and scope of the invention as set forth in the appended claims.

What is claimed is:

1. In a hybrid computer system provided with an analog computer and a digital computer which are functionally combined with each other so as to carry out required computation, while exchanging their informations from one to another, wherein the analog computer comprises analog integrators, to which an output of the digital computer is applied respectively, the improvement which comprises: an electrical device disposed at each of said analog integrators for compensating a digital execution time in the hybrid computer system and including a potentiometer, to which an input signal of the analog integrator is applied and whose multiplication factor is set to be equal to the product of the digital execution time and the multiplication factor of said integrator; an inverter to invert an output signal of the potentiometer; and means to add an inverted output signal of the inverter to the output signal of said integrator.

2. In a hybrid computer system provided with an analog computer and a digital computer which are functionally combined with each other so as to carry out required computation, while exchanging their informations from one to another, wherein the analog computer comprises analog intergrators, to which an output of the digital computer is applied respectively, each having a high gain amplifier, an integration capacitor inserted into the feedback circuit of said amplifier, and an input resistor for said amplifier, the improvement which comprises; a compensation capacitor to compensate a digital execution time in the hybrid computer system, which is connected across said input resistor whose capacitance is predetermined to be equal to the product of the digital execution time, the multiplication factor of said integrator, and the capacitance of the integration capacitor.

3. In a hybrid computer system provided with an analog computer and a digital computer which are functionally combined with each other so as to carry out required computation, while exchanging their informations from one to another, wherein the analog computer comprises analog integrators, to which an output of the digital computer is applied respectively, each having a high gain amplifier, an integration capacitor inserted into the feedback circuit of said amplifier and an input resistor for said amplifier, the improvement which comprises: an adjustable compensation capacitor to compensate a digital execution time in the hybrid computer system, which is connected across said input resistor whose capacitance is adjusted to be equal to the product of the digital execution time, the multiplication factor of said integrator, and the capacitance of the integration capacitor.

4. In a hybrid computer system provided with an analog computer and a digital computer which are functionally combined with each other so as to carry out required computation, while exchanging their informations from one to another, wherein the analog computer comprises analog integrators, to which the output of the digital computer is applied respectively, each having a high gain amplifier, an integration capacitor inserted into the feedback circuit of said amplifier, and an input resistor for said amplifier, the improvement which comprises: a series circuit of a potentiometer and a compensation capacitor to compensate a digital execution time in the hybrid computer system which is connected across said input resistor, the multiplication factor of the potentiometer being set to be equal to the product of the digital execution time, the multiplication factor of said integrator, the ratio of the integration capacitor, and the compensation capacitor.

References Cited

UNITED STATES PATENTS 2,946,943 7/1960 Nye et al. ---------- 328—127

FOREIGN PATENTS 1,393,916 2/1965 France.

OTHER REFERENCES

Johnson, Analog Computer Techniques, McGraw Hill Book Co. (1956), pp. 59–61.

U.S. Cl. X.R.

EUGENE G. BOTZ, Primary Examiner

F. D. GRUBER, Assistant Examiner

235—183; 328—127